United States Patent
Chou et al.

(10) Patent No.: US 12,437,822 B2
(45) Date of Patent: Oct. 7, 2025

(54) MEMORY DEVICE AND READING METHOD THEREOF

(71) Applicant: MACRONIX INTERNATIONAL CO., LTD., Hsinchu (TW)

(72) Inventors: You-Liang Chou, Taichung (TW); Wen-Jer Tsai, Hualien (TW); Chun-Chang Lu, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 161 days.

(21) Appl. No.: 18/458,201

(22) Filed: Aug. 30, 2023

(65) Prior Publication Data
US 2024/0371455 A1 Nov. 7, 2024

Related U.S. Application Data

(60) Provisional application No. 63/464,203, filed on May 5, 2023.

(51) Int. Cl.
*G11C 29/02* (2006.01)
*G11C 8/08* (2006.01)
*G11C 29/52* (2006.01)

(52) U.S. Cl.
CPC .............. *G11C 29/022* (2013.01); *G11C 8/08* (2013.01); *G11C 29/52* (2013.01)

(58) Field of Classification Search
CPC .......... G11C 29/022; G11C 8/08; G11C 29/52
See application file for complete search history.

(56) References Cited

U.S. PATENT DOCUMENTS

| | | | | |
|---|---|---|---|---|
| 2013/0301360 A1* | 11/2013 | Winter | ............... | G11C 16/3459 |
| | | | | 365/185.22 |
| 2014/0347935 A1* | 11/2014 | Kim | .................... | G11C 11/5642 |
| | | | | 365/185.17 |

(Continued)

FOREIGN PATENT DOCUMENTS

TW 201214438 A 4/2012

OTHER PUBLICATIONS

Sim, et al.: "A New Read Scheme for Alleviating Cell-to-Cell Interference in Scaled-Down 3D NAND Flash Memory"; Electronics Sep. 2020, 1775; doi:10.3390/electronics9111775; www.mdpi.com/journal/electronics; pp. 1-9.

(Continued)

*Primary Examiner* — Mohammed A Bashar
(74) *Attorney, Agent, or Firm* — McClure, Qualey & Rodack, LLP

(57) ABSTRACT

A memory device and a reading method thereof are provided. A second word line and a third word line are adjacent to a first word line. The reading method includes the following steps. A read procedure is executed to read a plurality of memory cells of the first word line. When a read error occurs, a re-read procedure is executed for some of the memory cells belonging to a state marginal group. The read procedure includes: applying a read voltage to the first word line; applying a first pass voltage to the second word line and the third word line. The re-read procedure includes: applying the read voltage to the first word line; applying a second pass voltage and a third pass voltage different from the first pass voltage to the second word line and the third word line respectively.

20 Claims, 8 Drawing Sheets

(56) References Cited

U.S. PATENT DOCUMENTS

2016/0343414 A1\* 11/2016 Lee .................. G11C 16/3427
2020/0211653 A1 7/2020 Chen
2023/0085319 A1 3/2023 Jung

OTHER PUBLICATIONS

Cai, et al.: "Data Retention in MLC NAND Flash Memory: Characterization, Optimization, and Recovery"; 2015 IEEE 21st International Symposium on High Performance Computer Architecture (HPCA); pp. 1-13.
Yalcin, et al.: "Neighbor-cell assisted error correction for MLC NAND flash memories"; ACM SIGMETRICS Performance Evaluation Review • Jun. 2014; pp. 1-15.

\* cited by examiner

MEMORY DEVICE AND READING METHOD THEREOF

This application claims the benefit of U.S. provisional application Ser. No. 63/464,203, filed May 5, 2023, the subject matter of which is incorporated herein by reference.

TECHNICAL FIELD

The disclosure relates in general to an electrical element and an operation method thereof, and more particularly to a memory device and a reading method thereof.

BACKGROUND

With the development of memory, various kinds of memory are constantly being introduced. Memory can be used to store various digital data and has been widely used in various electronic devices. However, according to the physical characteristics of some memories, there will be a phenomenon of threshold voltage shift after long-term storage, which will lead to read errors. Therefore, it is necessary to reduce the read error rate through various technologies.

In order to reduce the read error rate, the Error-correcting codes (ECC) technology has been developed. However, the error correction technology requires an additional error correction operation circuit to check and correct data, and the error correction operation circuit will occupy a considerable area, seriously affecting the goal of miniaturization of electronic components. In addition, the error correction operation will also increase the memory read latency, seriously affecting the memory read speed. Furthermore, too many error correction operations will also reduce the lifespan of the memory. Therefore, researchers are working hard to develop innovative techniques to reduce the data read error rate.

SUMMARY

The disclosure is directed to a memory device and a reading method thereof. In a re-read procedure, through an adjustment of the pass voltage, the threshold voltage of the memory cells connected to the selected word line can be changed, thereby the threshold voltage shift due to long-term storage is mitigated and the data reading error rate is significantly reduced.

According to one embodiment, a reading method of a memory device is provided. The memory device at least includes a first word line, a second word line and a third word line. The second word line and the third word line are adjacent to the first word line. The reading method includes the following steps. A read procedure is executed to read a plurality of memory cells connected to the first word line. A re-read procedure is executed for some of the memory cells belonging to a state marginal group when a read error occurs. The read procedure includes: applying a read voltage to the first word line; applying a first pass voltage to the second word line and the third word line, when applying the read voltage to the first word line. The re-read procedure includes: applying the read voltage to the first word line; applying a second pass voltage to the second word line, when applying the read voltage to the first word line; applying a third pass voltage to the third word line, when applying the read voltage to the first word line. The second pass voltage is different from the first pass voltage. The third pass voltage is different from the first pass voltage.

According to another embodiment, a memory device is provided. The memory device includes a first word line, a second word line, a third word line and a controlling circuit. The second word line and the third word line are adjacent to the first word line. The controlling circuit is configured to execute a read procedure to read a plurality of memory cells connected to the first word line, and configured to execute a re-read procedure for some of the memory cells belonging to a state marginal group when a read error occurs. In the read procedure, the controlling circuit applies a read voltage to the first word line; the controlling circuit applies a first pass voltage to the second word line and the third word line when applying the read voltage to the first word line. In the re-read procedure, the controlling circuit applies the read voltage to the first word line; the controlling circuit applies a second pass voltage to the second word line, when applying the read voltage to the first word line; the controlling circuit applies a third pass voltage to the third word line, when applying the read voltage to the first word line. The second pass voltage is different from the first pass voltage. The third pass voltage is different from the first pass voltage.

Figure 1:
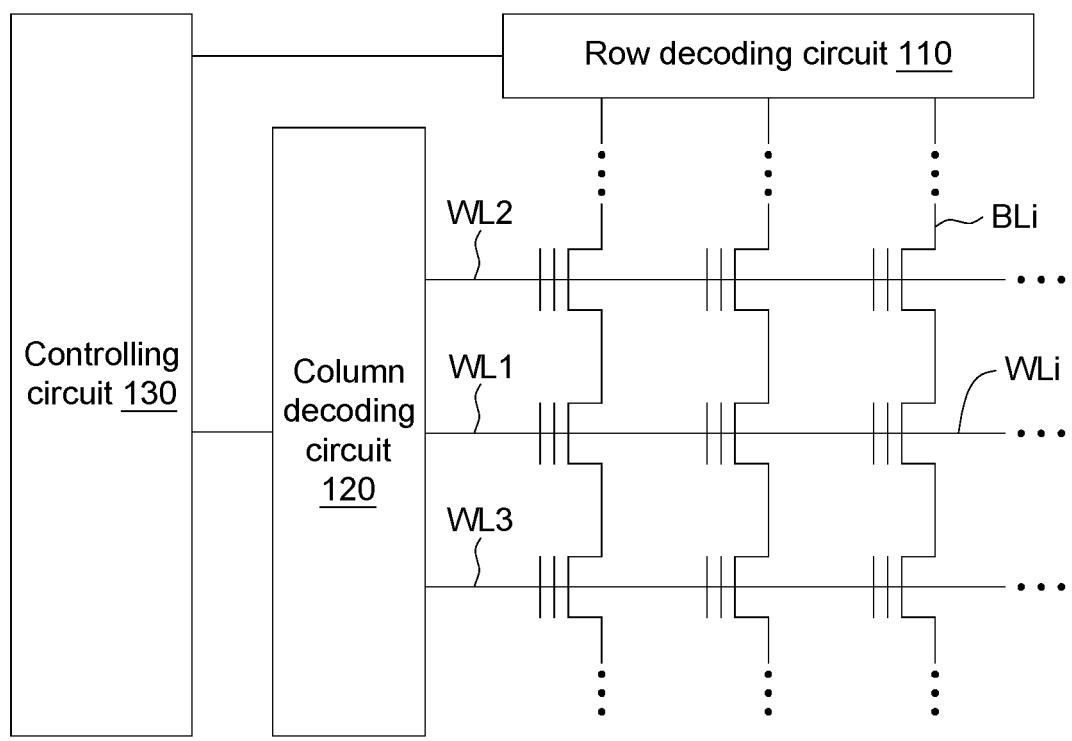
FIG. 1 shows a schematic diagram of a memory device according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a schematic diagram of a memory device 100 according to an embodiment. The memory device 100 is, for example, a NAND flash memory. The memory device 100 includes a plurality of bit lines BLi, a plurality of word lines WLi, a row decoding circuit 110, a column decoding circuit 120 and a controlling circuit 130. The word lines WLi include a first word line WL1, a second word line WL2 and a third word line WL3 which are adjacent. The second word line WL2 and the third word line WL3 are adjacent to the first word line WL1, and located at two sides of the first word line WL1.

The row decoding circuit 110 is coupled to the bit lines BLi. The column decoding circuit 120 is coupled to the word lines WLi. The controlling circuit 130 is coupled to the row decoding circuit 110 and the column decoding circuit 120. The controlling circuit 130 is used to control the voltages applied to the bit line BLi and the word lines WLi to execute an erase procedure, a programming procedure or a read procedure.

Figure 2:
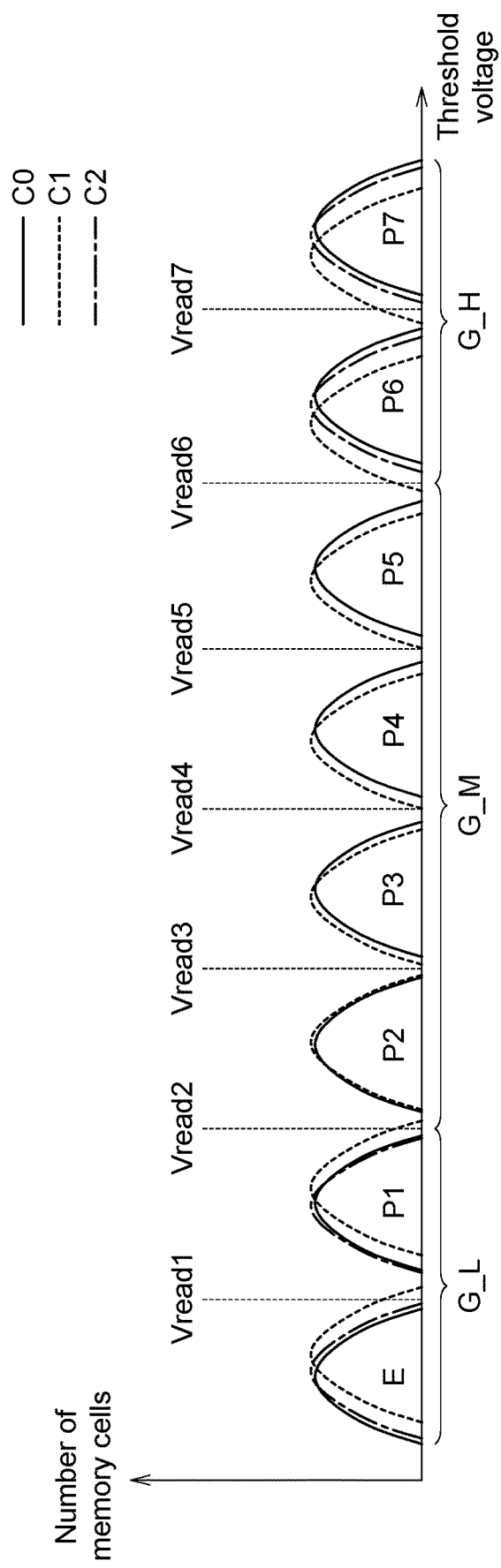
FIG. 2 illustrates the threshold voltage shift of a plurality of memory cells according to an embodiment.

Please refer to FIG. 2, which illustrates the threshold voltage shift of a plurality of memory cells according to an embodiment. Taking Triple Level Cell (TLC) for storing 8-bits data as an example, the memory cells have 8 states: an erase state E, a first programming state P1, a second programming state P2, a third programming state P3, a fourth programming state P4, and a fifth programming state P5, a sixth programming state P6 and a seventh programming state P7. The threshold voltages of the erase state E, the first programming state P1, the second programming state P2, the third programming state P3, the fourth programming state P4, the fifth programming state P5, the sixth programming state P6 and the seventh programming state P7 increase in sequence. In one embodiment, the erase state E and the first programming state P1 may be grouped into a low level state group G_L; the second programming state P2, the third programming state P3, the fourth programming state P4 and the fifth programming state P5 may be grouped into a median quasi-state group G_M; the sixth programming state P6 and the seventh programming state P7 may be grouped into a high level state group G_H. The low level state group G_L and the high level state group G_H belong to a state marginal group.

In another embodiment, the erase state E, the first programming state P1 and the second programming state P2 may be grouped into the low level state group G_L; the third programming state P3 and the fourth programming state P4 may be grouped into the median quasi-state group G_M; the fifth programming state P5, the sixth programming state P6 and the seventh programming state P7 may be grouped into the high level state group G_H. The low level state group G_L and the high level state group G_H belong to the state marginal group.

In another embodiment, the multi-level memory cells (MLCs) may be used to store 2-bits data, and have 4 states: the erase state, the first programming state, the second programming state and the third programming state. The threshold voltages of the erase state, the first programming state, the second programming state, the third programming state increase in sequence. The erase state may be grouped into the low level state group G_L; the first programming state and the second programming state may be grouped into the median quasi-state group G_M; the third programming state may be grouped into the high level state group G_H. The low level state group G_L and the high level state group G_H belong to the state marginal group.

In another embodiment, the Quad-level memory cells (QLCs) may be used to store 4-bits data, and have 16 states: the erase state, the first programming state, the second programming state, the third programming state, the fourth programming state, the fifth programming state, the sixth programming state, the seventh programming state, an eighth programming state, a ninth programming state, a tenth programming state, an eleventh programming state, a twelfth programming state, a thirteenth programming state, a fourteenth programming state and a fifteenth programming state. The threshold voltages of the erase state, the first programming state, the second programming state until the fifteenth programming state increase in sequence. The erase state and the first programming state to the fourth programming state may be grouped into the low level state group G_L; the fifth programming state to the tenth programming state may be grouped into the median quasi-state group G_M; the eleventh programming state to the fifteenth programming state may be grouped into the high level state group G_H. The low level state group G_L and the high level state group G_H belong to the state marginal group.

The number of bits of the memory cells is not used to limit the present technology. In another embodiment, the memory cells may have various numbers of erase/program states.

Refer back to FIG. 2. When the memory cells are just programmed, the distribution curve C0 of the erase state E, the first programming state P1, the second programming state P2, the third programming state P3, the fourth programming state P4, the fifth programming state P5, the sixth programming state P6 and the seventh programming state P7 are respectively located in the 8 intervals distinguished by the read voltages Vread1, Vread2, Vread3, Vread4, Vread5, Vread6, Vread7. Therefore, the data can be correctly read by using the read voltage Vread1, Vread2, Vread3, Vread4, Vread5, Vread6, Vread7.

However, after a long time of use, the memory cells will have a phenomenon of threshold voltage shift. As shown in FIG. 2, after a long time of use, the memory cells will have a shifted distribution curve C1. As shown in the distribution curve C1, the distribution curve C1 of the memory cells belonging to the low level state group G_L has shifted to the right; the distribution curve C1 of the memory cells belonging to the high level state group G_H has shifted to the left, resulting in a read error.

In this embodiment, the controlling circuit 130 reads memory cells first. If a reading error occurs, the memory cells belonging to the state marginal group will be re-read in a special way, and the data can be correctly read.

Figure 3:
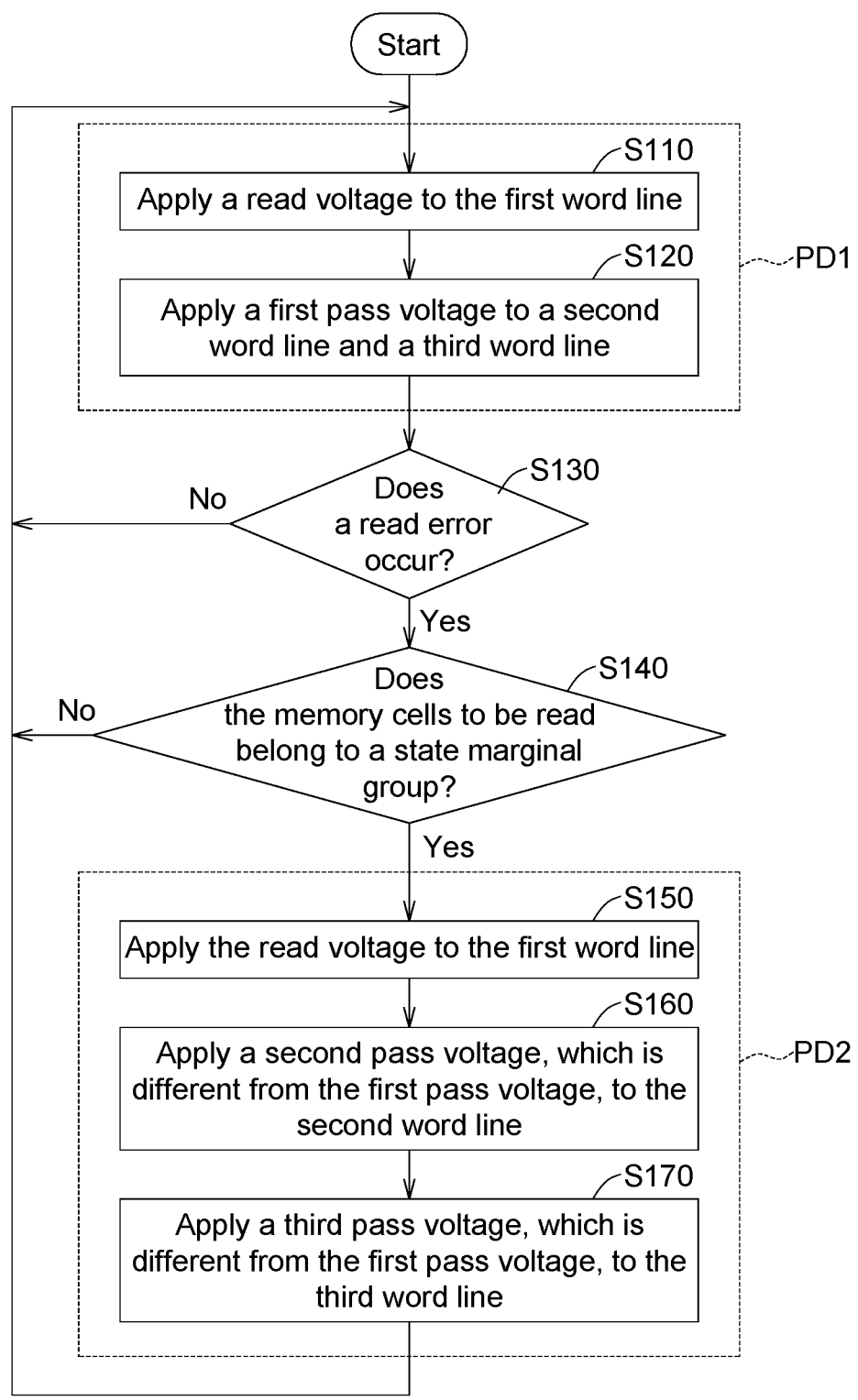
FIG. 3 shows a flow chart of a reading method of the memory device according to an embodiment.

Please refer to FIG. 3, which shows a flow chart of a reading method of the memory device 100 according to an embodiment. The reading method of the memory device 100 includes a read procedure PD1 and a re-read procedure PD2. The read procedure PD1 includes steps S110 to S120.

Figure 4:
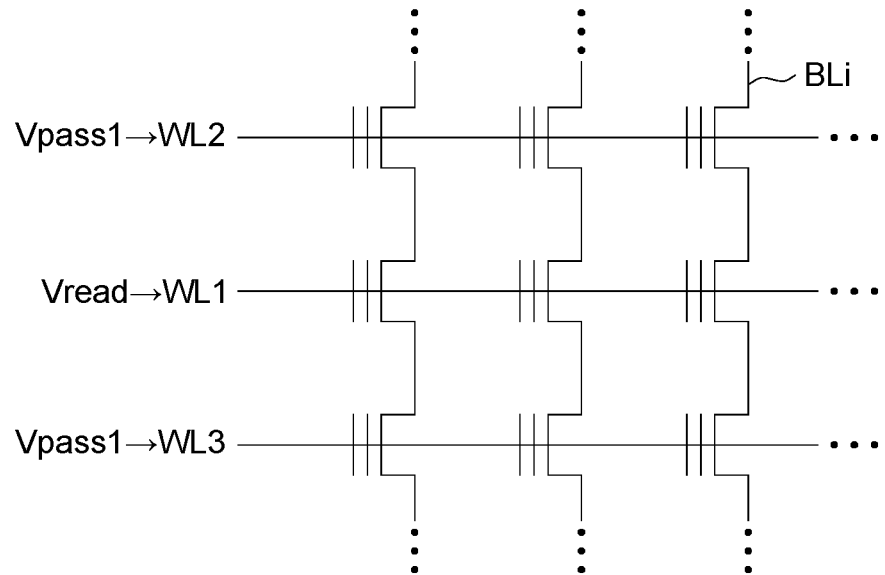
FIG. 4 illustrates an example of a read procedure.

Please refer to FIG. 4, which illustrates an example of the read procedure PD1. The first word line WL1, the second word line WL2 and the third word line WL3 of the word lines WLi are taken as an example. In the step S110 of the read procedure PD1, the controlling circuit 130 applies a read voltage Vread to the first word line WL1. The read voltage Vread is, for example, the aforementioned read voltage Vread1, Vread2, Vread3, Vread4, Vread5, Vread6, Vread7.

Then, in the step S120 of the read procedure PD1, the controlling circuit 130 applies a first pass voltage Vpass1 to the second word line WL2 and the third word line WL3. The step S110 and step S120 of the read procedure PD1 are executed at the same time. In the read procedure PD1, the second word line WL2 and the third word line WL3 are applied with the same first pass voltage Vpass1 to turn on the memory cells connected to the second word line WL2 and the third word line WL3.

In the read procedure PD1, as long as there is no threshold voltage shift in the memory cell, different data contents can be read according to different read voltages Vread. However, after a long time of use, the memory cells may have a phenomenon of threshold voltage shift.

In the step S130, the controlling circuit 130 determines whether a read error occurs. The controlling circuit 130, for example, determines whether a reading error has occurred through an error checking operation. If the reading error has been occurred, then the process proceeds to the step S140.

In the step S140, the controlling circuit 130 determines whether the memory cells to be read belong to the state marginal group (that is, the low level state group G_L and the high level state group G_H). The low level state group G_L includes, for example, the erase state E and the first programming state P1. The high level state group G_H includes, for example, the sixth programming state P6 and the seventh programming state P7. If the memory cells to be read belong to the state marginal group, the process proceeds to the re-read procedure PD2.

Figure 5:
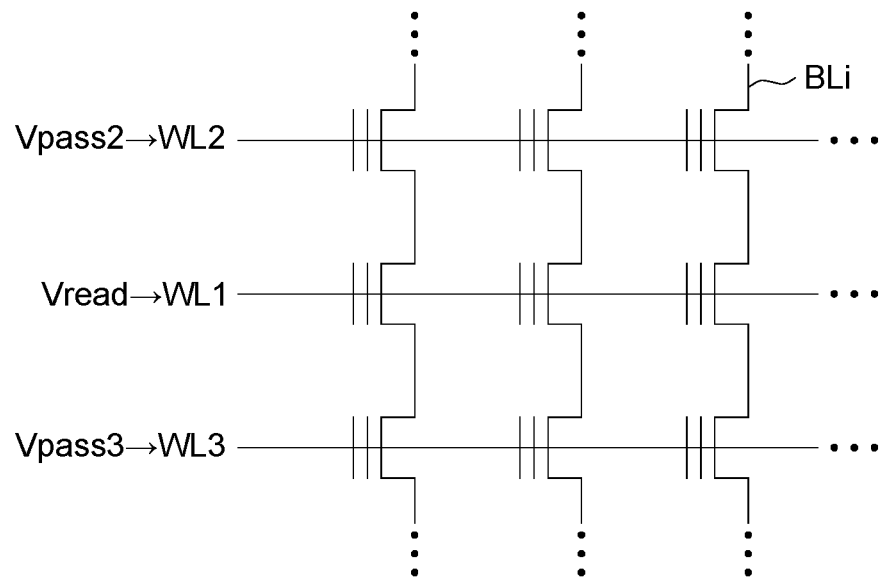
FIG. 5 illustrates an example of a re-read procedure.

Please refer to FIG. 5, which illustrates an example of the re-read procedure PD2. The re-read procedure PD2 includes steps S150 to S170. In the step S170 of the re-read procedure PD2, the controlling circuit 130 applies the read voltage Vread to the first word line WL1. In the read procedure PD1 and the re-read procedure PD2, the read voltage Vread applied to the first word line WL1 remains unchanged.

In the step S160 of the re-read procedure PD2, the controlling circuit 130 applies a second pass voltage Vpass2 to the second word line WL2. The second pass voltage Vpass2 is different from the first pass voltage Vpass1.

In the step S170 of the re-read procedure PD2, the controlling circuit 130 applies a third pass voltage Vpass3 to the third word line WL3. The third pass voltage Vpass3 is different from the first pass voltage Vpass1. The steps S150 to S170 of the re-read procedure PD2 are executed simultaneously.

Through the second pass voltage Vpass2 and the third pass voltage Vpass3, the threshold voltage of the memory cells connected to the first word line WL1 will be changed, thereby eliminating the threshold voltage shift. For example, as shown in FIG. 2, when the memory cells are executed the re-read procedure P2 of the present disclosure, the memory cells will have a distribution curve C2. The distribution curve C2 of the memory cells belonging to the low level state group G_L has shifted to the left and returned to the correct range; the distribution curve C2 of the memory cells belonging to the high level state group G_H has shifted to the right and returned to the correct range, so the data can be read correctly.

Figure 6:
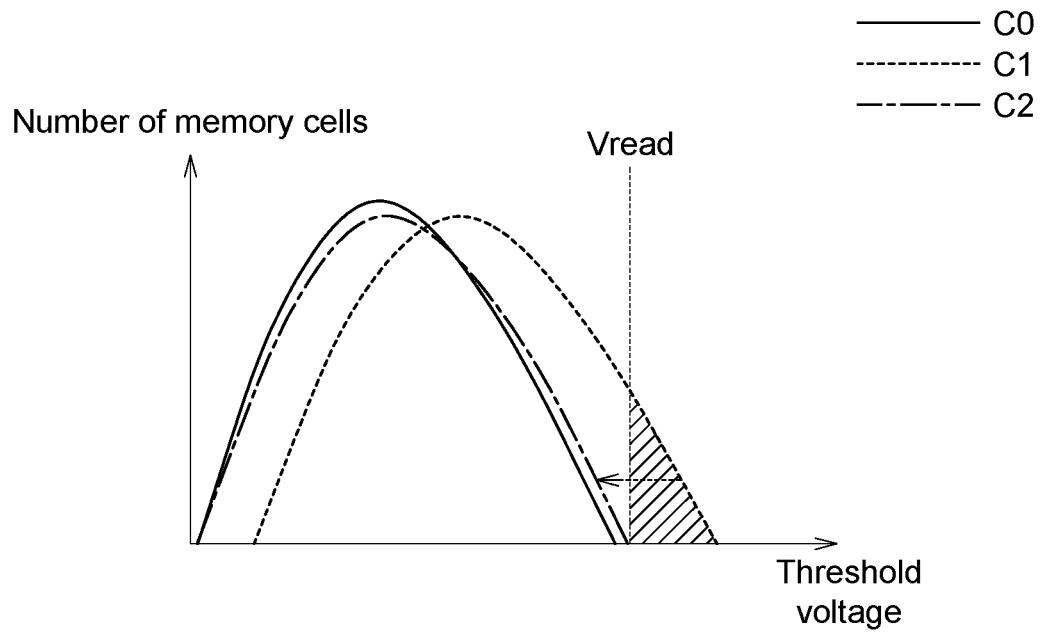
FIG. 6 shows the threshold voltage shift of the memory cells belonging to a low level state group, suffered from interference, or program/erase (P/E) cycled according to an embodiment.

Please refer to FIG. 6, which shows the threshold voltage shift of the memory cells belonging to the low level state group G_L, suffered from interference, or program/erase (P/E) cycled cells according to an embodiment. After the memory device 100 is used for a long time, the distribution curve C1 of the memory cells belonging to the low level state group G_L, suffered from interference, or program/erase (P/E) cycled has shifted to the right. In this embodiment, when the memory cells are executed the re-read procedure PD2 of the present disclosure, the memory cells will have the distribution curve C2. The distribution curve C2 of the memory cells belonging to the low level state group G_L, suffered from interference, or program/erase (P/E) cycled has shifted to the left and returned to the correct range, so the data can be read correctly.

Figure 7:
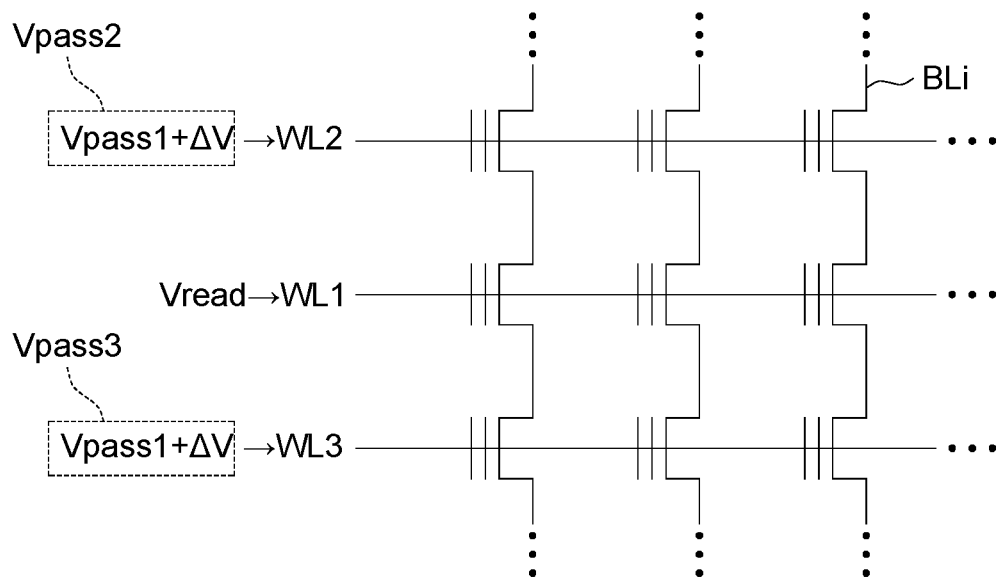
FIG. 7 illustrates the re-read procedure for the memory cells belonging to the low level state group, suffered from interference, or program/erase (P/E) cycled.

Please refer to FIG. 7, which illustrates the re-read procedure PD2 for the memory cells belonging to the low level state group G_L, suffered from interference, or program/erase (P/E) cycled. In this embodiment, the second pass voltage Vpass2 equals the first pass voltage Vpass1 plus an adjusting voltage ΔV, and the third pass voltage Vpass3 equals the first pass voltage Vpass1 plus the adjusting voltage ΔV. The adjusting voltage ΔV is, for example, 0.01% to 50% of the first pass voltage Vpass1. The second pass voltage Vpass2 and the third pass voltage Vpass3 are substantially identical. When reading the memory cells connected to the first word line WL1, the second pass voltage Vpass2 and the third pass voltage Vpass3, which are higher than the first pass voltage Vpass1, are applied to the second word line WL2 and the third word line WL3, so the memory cells connected to the first word line WL1 becomes easy to be turned on and have the distribution curve C2 that shifts to the left and returns to the correct range.

The adjusting voltage ΔV may be positively related to the cycle times of memory device 100. Generally speaking, the higher the number of operations of the memory device 100, the more serious the deviation of the distribution curve C1, so a higher adjusting voltage ΔV may be used.

The adjusting voltage ΔV may be positively related to the retention time of the memory device 100. Generally speaking, the longer the data retention time of the memory device 100 is, the more serious the deviation of distribution curve C1 is, so a higher adjusting voltage ΔV may be used.

The adjusting voltage ΔV may be adaptively related to the neighboring data patterns. The adjusting voltage ΔV may be positively related to the marginal degree of the state. Generally speaking, the erase state E is more marginal than the first programming state P1, and the shift of the distribution curve C1 of the erase state E will be more serious than that of the distribution curve C1 of the first programming state P1, so the adjusting voltage ΔV for the erase state E may be the highest and the adjusting voltage ΔV for the first programming state P1 may be the next highest.

Figure 8:
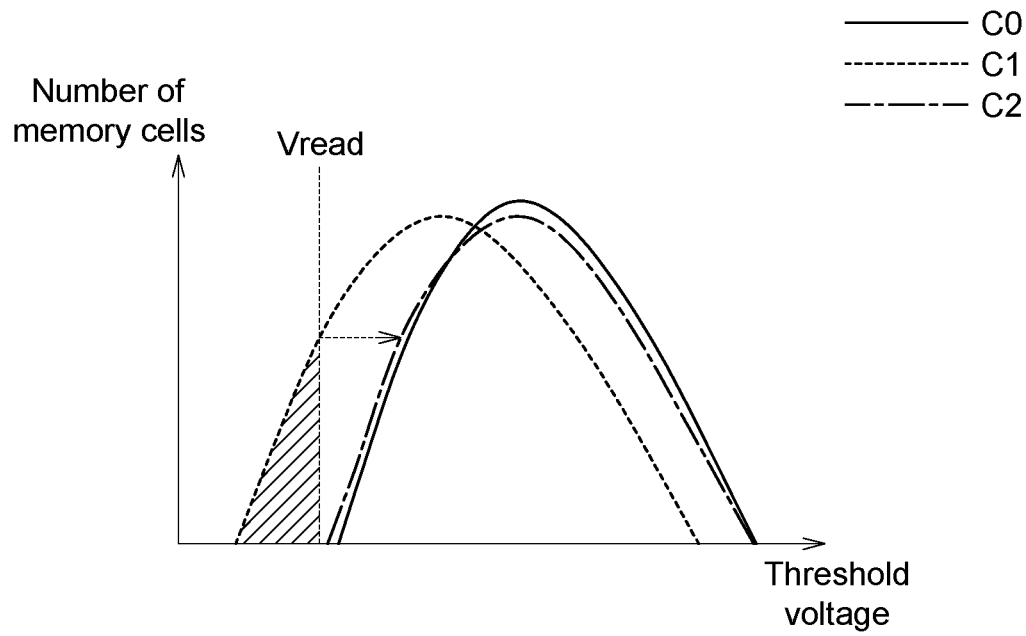
FIG. 8 shows the threshold voltage shift of the memory cells belonging to a high level state group according to an embodiment.

Please refer to FIG. 8, which shows the threshold voltage shift of the memory cells belonging to the high level state group G_H according to an embodiment. After the memory device 100 has been used for a long time, the distribution curve C1 of the memory cells belonging to the high level state group G_H has shifted to the left. In this embodiment, when the memory cells are executed the re-read procedure PD2 of the present disclosure, the memory cells will have the distribution curve C2. The distribution curve C2 of the memory cells belonging to the high level state group G_L may be shifted to the right and returned to the correct range.

Figure 9:
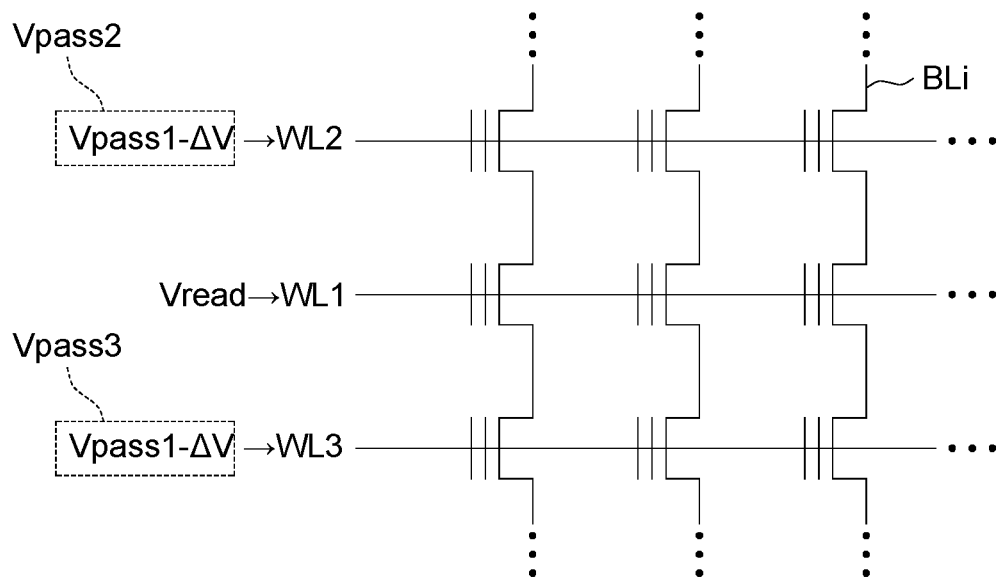
FIG. 9 illustrates the re-read procedure for the memory cells belonging to the high level state group.

Please refer to FIG. 9, which illustrates the re-read procedure PD2 for the memory cells belonging to the high level state group G_H. In this embodiment, the second pass voltage Vpass2 equals the first pass voltage Vpass1 minus the adjusting voltage ΔV, and the third pass voltage Vpass3 equals the first pass voltage Vpass1 minus the adjusting voltage ΔV. The adjusting voltage ΔV is, for example, 0.01% to 50% of the first pass voltage Vpass1. The second pass voltage Vpass2 and the third pass voltage Vpass3 are substantially identical. When reading the memory cells connected to the first word line WL1, the second pass voltage Vpass2 and third pass voltage Vpass3, which are lower than the first pass voltage Vpass1, are applied to the second word line WL2 and third word line WL3, so the memory cells connected to the first word line WL1 becomes hard to be turned on and have the distribution curve C2 that shifts to the right and returns to the correct range.

The adjusting voltage ΔV may be positively related to the operation times of the memory device 100. Generally speaking, the higher the number of operations of the memory device 100, the more serious the deviation of the distribution curve C1, so a higher adjusting voltage ΔV may be used.

The adjusting voltage ΔV may be positively related to the retention time of the memory device 100. Generally speaking, the longer the data retention time of the memory device 100 is, the more serious the deviation of distribution curve C1 is, so a higher adjusting voltage ΔV may be used.

The adjusting voltage ΔV may be adaptively related to the neighboring data patterns. Generally speaking, the seventh programming state P7 is more marginal than the sixth programming state P6, and the shift of the distribution curve C1 of the seventh programming state P7 will more serious than that of the distribution curve C1 of the sixth programming state P6, so the adjusting voltage ΔV for the seventh programming state P7 may be the highest and the adjusting voltage ΔV for the sixth programming state P6 may be the next highest.

Figure 10:
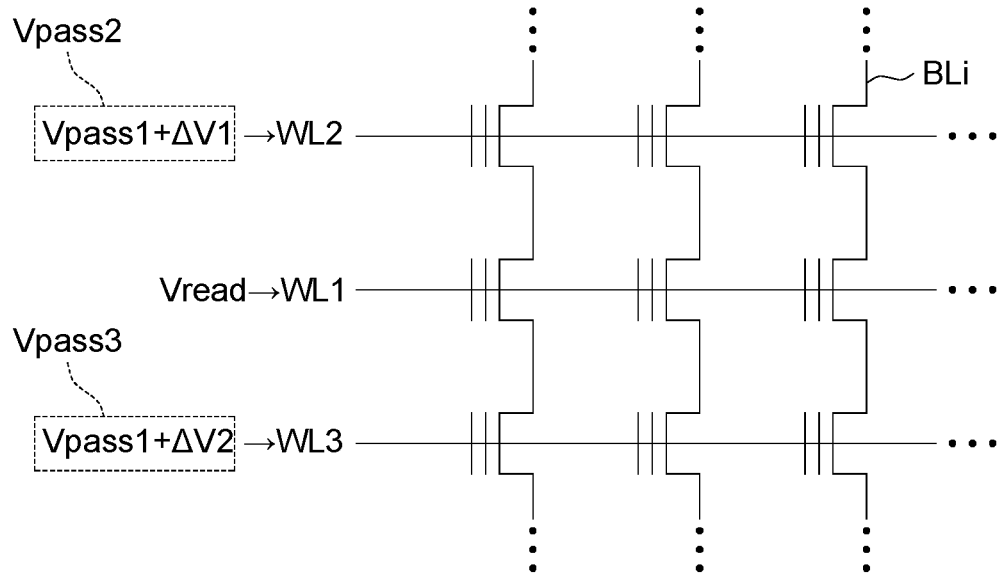
FIG. 10 illustrates another example of the re-read procedure for memory cells belonging to the low level state group, suffered from interference, or program/erase (P/E) cycled.

Please refer to FIG. 10, which illustrates another example of the re-read procedure PD2 for memory cells belonging to the low level state group G_L, suffered from interference, or program/erase (P/E) cycled. In this embodiment, the second pass voltage Vpass2 equals the first pass voltage Vpass1 plus an adjusting voltage ΔV1, and the third pass voltage Vpass3 equals the first pass voltage Vpass1 plus an adjusting voltage ΔV2. The adjusting voltage ΔV1 is, for example, 0.01% to 50% of the first pass voltage Vpass1, and the adjusting voltage ΔV2 is, for example, 0.01% to 50% of the first pass voltage Vpass1. For example, the adjusting voltage ΔV1 is set according to the states of the memory cells connected to the second word line WL2; the adjusting voltage ΔV2 is set according to the states of the memory cells connected to the third word line WL3. Therefore, the adjusting voltage ΔV1 may be different from the adjusting voltage ΔV2, and the second pass voltage Vpass2 and the third pass voltage Vpass3 may be different.

Figure 11:
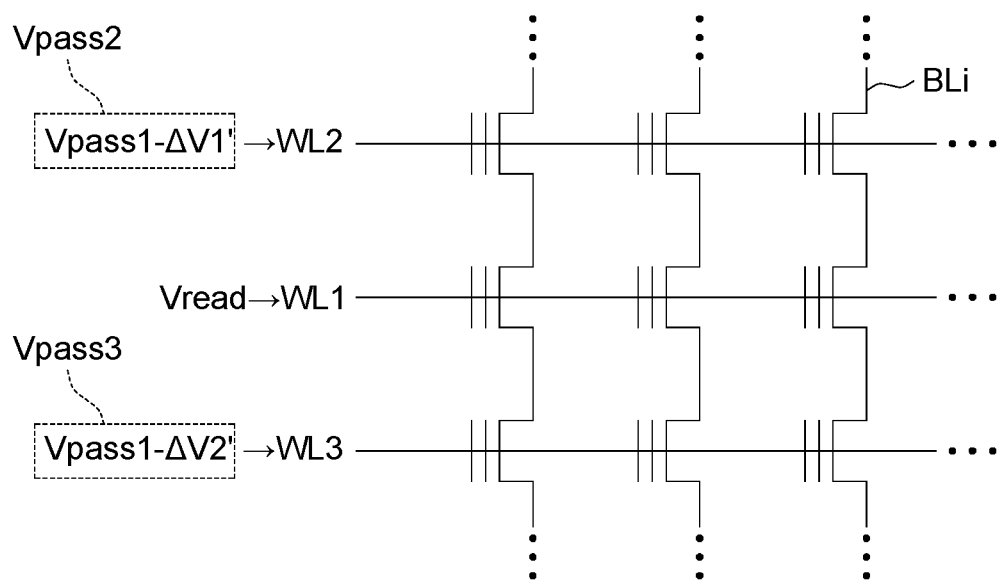
FIG. 11 illustrates another example of the re-read procedure for the memory cells belonging to the high level state group.

Please refer to FIG. 11, which illustrates another example of the re-read procedure PD2 for the memory cells belonging to the high level state group G_H. In this embodiment, the second pass voltage Vpass2 equals the first pass voltage Vpass1 minus an adjusting voltage ΔV1', and the third pass voltage Vpass3 equals the first pass voltage Vpass1 minus the adjusting voltage ΔV2'. The adjusting voltage ΔV1' is, for example, 0.01% to 50% of the first pass voltage Vpass1, and the adjusting voltage ΔV2' is, for example, 0.01% to 50% of the first pass voltage Vpass1. For example, the adjusting voltage ΔV1' is set according to the states of the memory cells connected to the second word line WL2; the adjusting voltage ΔV2' is set according to the states of the memory cells connected to the third word line WL3. Therefore, the adjusting voltage ΔV1' may be different from the adjusting voltage ΔV2', the second pass voltage Vpass2 and the third pass voltage Vpass3 may be different.

Figure 12:
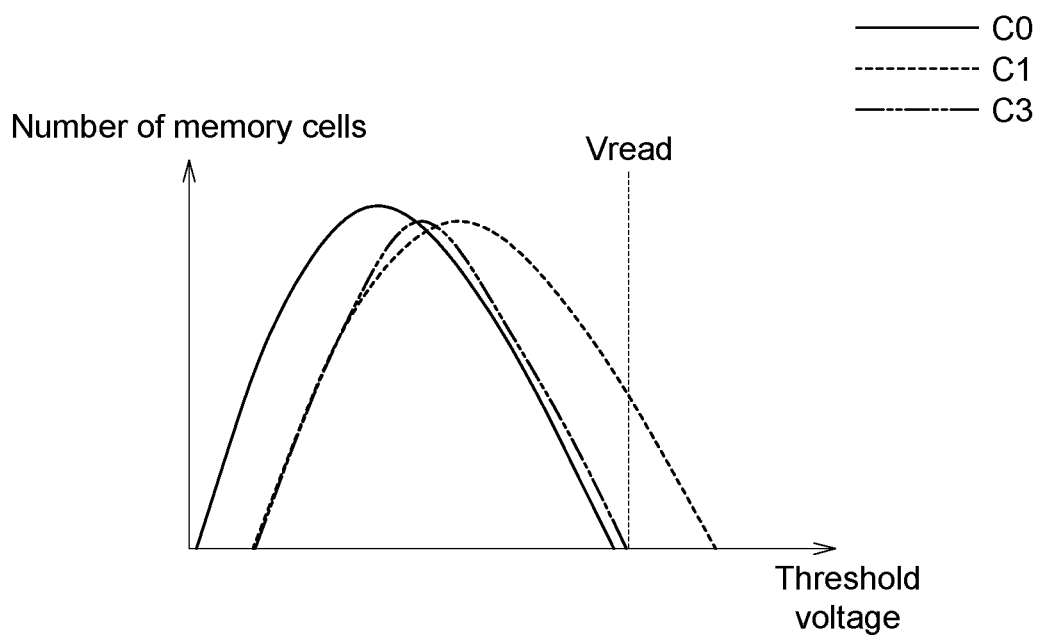
FIG. 12 illustrates that in the low level state group, suffered from interference, or program/erase (P/E) cycled, the re-read procedure is only executed for some memory cells with read errors.

Please refer to FIG. 12, which illustrates that in the low level state group G_L, suffer from interference, or program/erase (P/E) cycled, the re-read procedure PD2 is only executed for some memory cells with read errors. After the memory device 100 has been used for a long time, the distribution curve C2 of the memory cells belonging to the low level state group G_L, suffered from interference, or program/erase (P/E) cycled has shifted to the right. In this embodiment, the re-read procedure PD2 is only executed for some memory cells with read errors (e.g., the right half of the distribution curve C2). When the memory cells are executed the re-read procedure PD2 disclosed in this disclosure, the memory cells will have a distribution curve C3. The right half of the distribution curve C3 of the memory cells belonging to the low level state group G_L may be shifted to the left and returned to the correct range.

Figure 13:
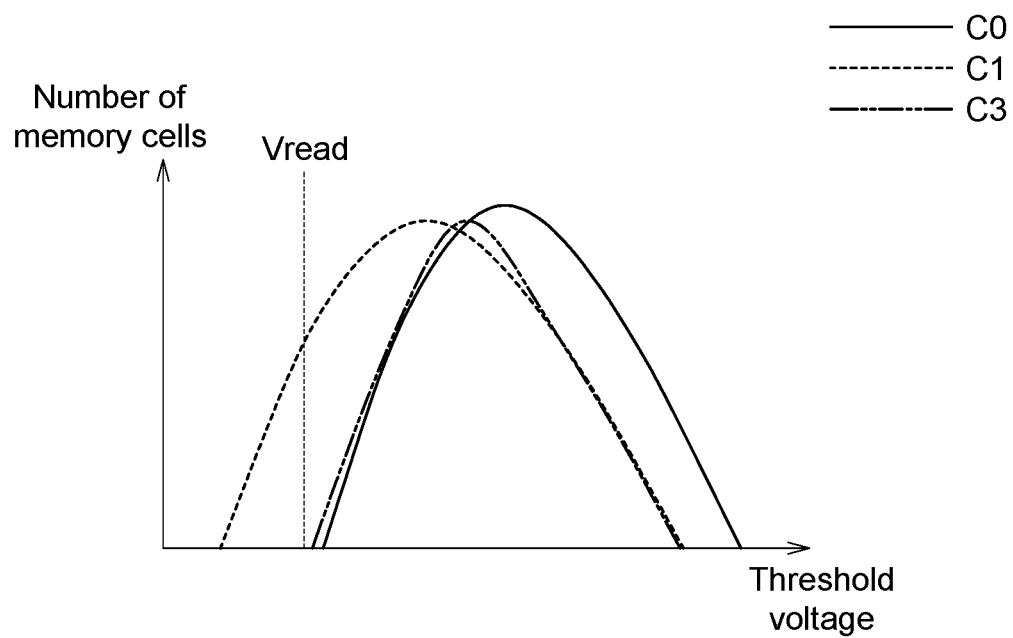
FIG. 13 illustrates that in the high level state group, the re-read procedure is only executed for some memory cells with read errors.

Please refer to FIG. 13, which illustrates that in the high level state group G_H, the re-read procedure PD2 is only executed for some memory cells with read errors. After the memory device 100 has been used for a long time, the distribution curve C2 of the memory cells belonging to the high level state group G_H has shifted to the left. In this embodiment, the re-read procedure PD2 is only executed for some memory cells with read errors (e.g., the left half of the distribution curve C2). When the memory cells are executed the re-read procedure PD2 of the present disclosure, the memory cells will have the distribution curve C3. The left half of the distribution curve C3 of the memory cells belonging to the high level state group G_H can be shifted to the right and returned to the correct region or right region.

According to the above embodiments, in the re-read procedure PD2, through the adjustment of the second pass voltage Vpass2 and the third pass voltage Vpass3, the threshold voltage of the memory cells connected to the first word line WL1 can be changed, thereby the threshold voltage shift due to retention, interference, or program/erase (P/E) cycles is mitigated and the data reading error rate is significantly reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A reading method of a memory device, wherein the memory device at least includes a first word line, a second word line and a third word line, the second word line and the third word line are adjacent to the first word line, and the reading method comprises:
    executing a read procedure to read a plurality of memory cells connected to the first word line, wherein the read procedure includes:
        applying a read voltage to the first word line; and
        applying a first pass voltage to the second word line and the third word line, when applying the read voltage to the first word line; and
    executing a re-read procedure for some of the memory cells belonging to a state marginal group when a read error occurs, wherein the re-read procedure includes:
        applying the read voltage to the first word line;
        applying a second pass voltage to the second word line, when applying the read voltage to the first word line, wherein the second pass voltage is different from the first pass voltage, and the second pass voltage equals the first pass voltage plus an adjusting voltage such that the second pass voltage is greater than the first pass voltage; and
        applying a third pass voltage to the third word line, when applying the read voltage to the first word line, wherein the third pass voltage is different from the first pass voltage.

2. The reading method of the memory device according to claim 1, wherein the second pass voltage and the third pass voltage are substantially identical.

3. The reading method of the memory device according to claim 1, wherein the second pass voltage and the third pass voltage are different.

4. The reading method of the memory device according to claim 1, wherein the second pass voltage equals the first pass voltage plus an adjusting voltage, and the third pass voltage equals the first pass voltage plus the adjusting voltage.

5. The reading method of the memory device according to claim 4, wherein the adjusting voltage is positively related to a cycle time of the memory device.

6. The reading method of the memory device according to claim 4, wherein the adjusting voltage is positively related to a retention time of the memory device.

7. The reading method of the memory device according to claim 4, wherein the adjusting voltage is 0.01% to 50% of the first pass voltage.

8. The reading method of the memory device according to claim 1, wherein the second pass voltage equals the first pass voltage minus an adjusting voltage, and the third pass voltage equals the first pass voltage minus the adjusting voltage.

9. The reading method of the memory device according to claim 1, wherein
each of the memory cells has an erase state, a first programming state, a second programming state, a third programming state, a fourth programming state, a fifth programming state, a sixth programming state and a seventh programming state;
the erase state, the first programming state, the second programming state, the third programming state, the fourth programming state, the fifth programming state, the sixth programming state and the seventh programming state have sequentially increasing threshold voltages;
the erase state, the first programming state, the sixth programming state and the seventh programming state are grouped into the state marginal group.

10. The reading method of the memory device according to claim 1, wherein the re-read procedure is executed only for some of the memory cells with read errors.

11. A memory device, at least comprises:
a first word line;
a second word line;
a third word line, wherein the second word line and the third word line are adjacent to the first word line; and
a controlling circuit, configured to execute a read procedure to read a plurality of memory cells connected to the first word line, and configured to execute a re-read procedure for some of the memory cells belonging to a state marginal group when a read error occurs,
wherein in the read procedure,
the controlling circuit applies a read voltage to the first word line;
the controlling circuit applies a first pass voltage to the second word line and the third word line when applying the read voltage to the first word line;
in the re-read procedure,
the controlling circuit applies the read voltage to the first word line;
the controlling circuit applies a second pass voltage to the second word line, when applying the read voltage to the first word line, wherein the second pass voltage is different from the first pass voltage, and the second pass voltage equals the first pass voltage plus an adjusting voltage such that the second pass voltage is greater than the first pass voltage;
the controlling circuit applies a third pass voltage to the third word line, when applying the read voltage to the first word line, wherein the third pass voltage is different from the first pass voltage.

12. The memory device according to claim 11, wherein the second pass voltage and the third pass voltage are substantially identical.

13. The memory device according to claim 11, wherein the second pass voltage and the third pass voltage are different.

14. The memory device according to claim 11, wherein the second pass voltage equals the first pass voltage plus an adjusting voltage, and the third pass voltage equals the first pass voltage plus the adjusting voltage.

15. The memory device according to claim 14, wherein the adjusting voltage is positively related to a cycle times of the memory device.

16. The memory device according to claim 14, wherein the adjusting voltage is positively related to a retention time of the memory device.

17. The memory device according to claim 14, wherein the adjusting voltage is 0.1% to 50% of the first pass voltage.

18. The memory device according to claim 11, wherein the second pass voltage equals the first pass voltage minus an adjusting voltage, and the third pass voltage equals the first pass voltage minus the adjusting voltage.

19. The memory device according to claim 11, wherein
each of the memory cells has an erase state, a first programming state, a second programming state, a third programming state, a fourth programming state, a fifth programming state, a sixth programming state and a seventh programming state;
the erase state, the first programming state, the second programming state, the third programming state, the fourth programming state, the fifth programming state, the sixth programming state and the seventh programming state have sequentially increasing threshold voltages;
the erase state, the first programming state, the sixth programming state and the seventh programming state are grouped into the state marginal group.

20. The memory device according to claim 11, wherein the controlling circuit executes the re-read procedure only for some of the memory cells with read errors.

* * * * *